United States Patent

[11] 3,601,940

[72] Inventor Albert B. Simon
    Ellicott City, Md.
[21] Appl. No. 706,037
[22] Filed Feb. 16, 1968
[45] Patented Aug. 31, 1971
[73] Assignee Westinghouse Electric Corporation
    Pittsburgh, Pa.

[54] EXTENDIBLE BOOM
    4 Claims, 3 Drawing Figs.

[52] U.S. Cl. ................................................ 52/108,
    242/54 A, 138/154, 29/155, 29/450
[51] Int. Cl. ................................................ E04h 12/18
[50] Field of Search ................................................ 52/108;
    242/54 A; 138/154, 166; 29/155, 450

[56] References Cited
    UNITED STATES PATENTS

| | | | |
|---|---|---|---|
| 246,232 | 8/1881 | Spencer | 138/154 |
| 592,459 | 10/1897 | Weitzel | 138/154 |
| 2,515,365 | 7/1950 | Zublin | 138/154 |
| 2,986,193 | 5/1961 | Howell | 242/54 A |
| 3,177,987 | 4/1965 | Swaim | 52/108 |
| 3,208,478 | 9/1965 | Baines | 138/166 |
| 3,357,457 | 12/1967 | Myer | 52/108 |
| 3,361,377 | 1/1968 | Trexler | 52/108 |
| 3,380,204 | 4/1968 | Fry et al. | 52/108 |
| 3,410,615 | 11/1968 | Bieber | 52/108 |

FOREIGN PATENTS

| | | | |
|---|---|---|---|
| 61,526 | 1892 | Germany | 52/108 |
| 10,516 | 1899 | Switzerland | 138/154 |

Primary Examiner—Frank L. Abbott
Assistant Examiner—Henry C. Sutherland
Attorneys—F. H. Henson, E. P. Klipfel and D. F. Straitiff ABSTRACT: An improved extendible tubular boom, particularly suitable for use in space, wherein interlocking side edges of the curled thin strip material of the boom cooperate to form a helical seam along the length of the boom.

PATENTED AUG 31 1971   3,601,940

90°- SEAM ANGLE 35

WITNESSES
Edwin E. Bassler
James F. Young

INVENTOR
Albert B. Simon
BY
D. J. Stoeltff
AGENT

EXTENDIBLE BOOM

The invention herein described was made under a contract with the National Aeronautics and Space Administration.

BACKGROUND OF THE INVENTION

1. Field of the Invention

Extendible booms of the type stored on a reel and self-forming into cylindrical shape upon unreeling.

2. Description of the Prior Art

Prior lightweight extendible booms of thin metal strip material stored in compact coiled form and self-biased to curl opposite side edges together upon playoff deployment from a storage reel to continuously form a cylindrical boom shape have employed a series of notches and tabs on such side edges which interengage during such deployment to cause circumferential abutment between these side edges to form an interlocking straight seam extending longitudinally along the length of the boom to impart a certain rigidity thereto.

A boom so constructed for use in space can extend beyond its deployer for a considerable length in the absence of a gravity environment and finds uses as antenna and gravity gradient stabilization elements, for example. Where accuracy in its pointing and/or remote positioning of its tip are of significant concern with respect to its use, however, such prior straight-seam booms may suffer from an undesirable degree of bending deflection or curvature distributed along their length which may be influenced by such factors as heat treatment during fabrication in behalf of obtaining the self-bias for erection shaping, during which an unintended bias may be introduced which tends to deflect the boom progressively along its length when deployed, and/or to a higher thermal resistivity circumferentially of the deployed boom at the seam, which, when "straight" as heretofore, leads to unequal thermal expansion across the seam in the presence of solar radiation, with a cumulative effect from one end of the boom to the other.

SUMMARY

In the boom construction of the present invention, by mating the side edges of the transversely curling strip at an angle during deployment so that such edges become offset to obtain a spiralling or helical seam along the length of the boom, any tendency for the boom to bend due to fabrication bias or to radiant heat differential across the seam is periodically reversed in direction along the length of the boom. This prevents the longitudinal cumulative deflection effect of previous straight seam or nonspiral-seam, booms of this general type, and affords opportunity for assuring a straightness of such booms not heretofore realizable.

DESCRIPTION OF THE PREFERRED EMBODIMENTS

Figure 1:
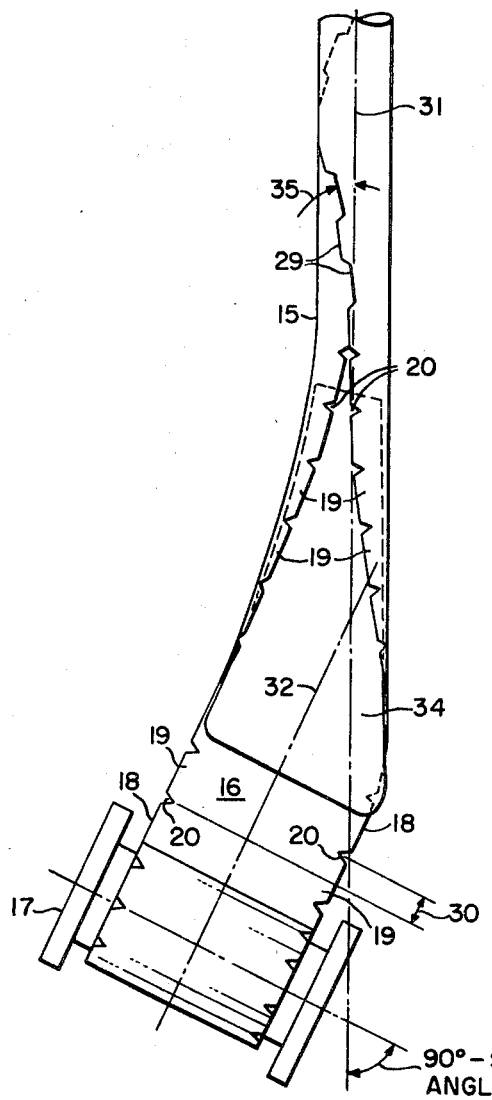
FIG. 1 is a view in outline showing one type of tab-and-notch edged strip in the state of being erected from a storage reel into an interlocked helical seam boom in accord with the invention.

Referring to FIG. 1, the exemplified boom 15 of the present invention may be of the type, for example, as described in detail in a final report to N.A.S.A. titled "Gravity Gradient Stabilization System Elements and Antenna Structures" under contract NAS5-9598, available from N.A.S.A. under Accession No. N66-23599, which type is constructed of a beryllium copper strip 16 several mils thick rollable onto a storage reel 17 and self-biased by previous heat treatment to continuously spring its side edges 18 together with alternating overlapping of tabs 19 upon unrolling from the storage reel 17 to form a hollow cylindrical boom with a straight locked seam, not shown herein. Ends of the tabs 19 in the longitudinal direction of the strip 16 are defined by V-shaped notches 20, and the apex of these notches on one strip edge 18 are held in abutment with the bottom of the notches of the other strip edge by the resilient springing action of the strip. To facilitate obtainment of the overlapping of the tabs 19 during erection of the boom, every other tab on each side may have its leading edge bent inwardly to readily slide under an opposite nonbent tab as the edges 18 of the strip 16 curl together during such erection, and the deployer means also employs guide means to assist in properly directing the strip edges together.

Figure 2:
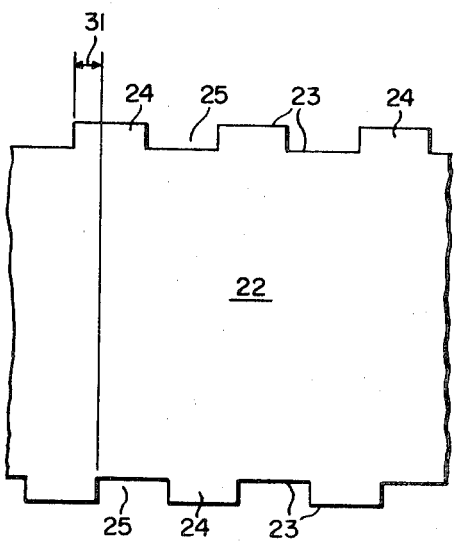
FIG. 2 is a plan view of a longitudinal sectional of a boom-forming strip of an alternate edge configuration adapted for forming an interlocked helical seam boom.
Figure 3:
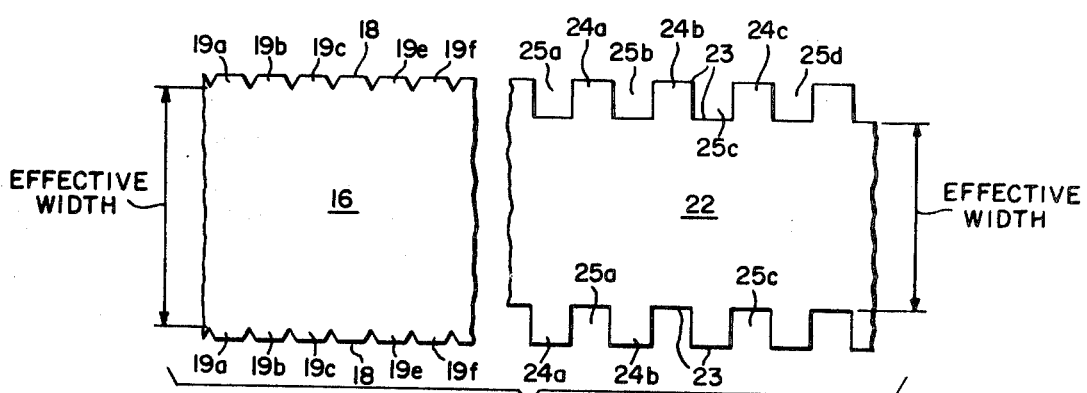
FIG. 3 are plan views of boom-forming strips of other alternate lock-tab edge configurations suitable for providing a helical seam boom in accord with the present invention.

Referring to FIG. 2 the invention may be embodied in or employed in conjunction with other types of lock-seam boom constructions, for example the general type set forth in U.S. Pats. No. 3,144,104 and 3,177,987 of Weir et al. and Swaim, respectively, wherein the strip 22, which curls itself transversely and springs its side edges 23 together to continuously form a cylindrical boom configuration when unrolled longitudinally from a storage reel, which has alternate rectangular tabs 24 and notches 25 on such edges; the tabs 24 being of the same length along the strip edge as the notches 25, and the notches 25 on one strip edge being disposed opposite to the tabs 24 of the other edge in a laid-out-flat- state of such strip, as disclosed in the above Weir et al. and Swaim patents. In this arrangement, the tabs 24 on one strip edge move into the notches 25 on the other strip edge and all tabs either overlap the interior or the exterior of the boom according to mode of seam formation permitted or encouraged by the deployer means.

In accord with the invention as it relates to a boom of the type shown in FIG. 1, the helical seam 29 which spirals around the periphery of the boom 15 can be obtained by a longitudinal offset 30 between the location of the V-shaped notches 20 on one edge of the strip 16 with respect to those on the opposite strip edge and causing one strip edge to be advanced longitudinally relative to the other edge during the lengthwise advancement of the strip while unwinding from the storage reel 17 whereby the offset notches at opposite strip edges become aligned for their interengagement and the overlapping of the tabs 19 therebetween. This relative advancement between strip edges results in deployment of the boom 15 along an axis 31 which is angulated from the longitudinal centerline 32 of the strip 16 when in its flat or substantially flat state and is accommodated by a suitably formed and oriented guide means 34 affiliated with deployer means which includes the storage reel 17 and usually other strip playout controlling means (not shown). The strip is preferably self-biased to inherently assume such edge-advancement configuration in addition to the longitudinal cylindrical shape with a residual springlike force urging the joint together by virtue of such a suitable heat treatment during its fabrication. However, where the degree of notch offset is relatively slight, and hence only a small degree of relative longitudinal movement of the edges of the strip is required for tab complementation at the seam-forming location, it may suffice to merely introduce the usual bias into the strip which urges its opposite side edges to come together directly, in which case the slight relative longitudinal advancement required for tab complementation can be effected by the strip guiding means 34 of the deployer.

The seam angle 35 between the direction of the helical seam 30 and the longitudinal axis 31 of the boom 15 comprising such seam determines the number of turns such seam makes for a given effective width of the strip 16 and boom length. Such seam angle also affects the diameter of the boom for a given strip width relative to its straight-seam diameter, from a small percentage of such straight-seam diameter within the first 20° of seam angle up to five or more times such straight-seam diameter at seam angles in the vicinity of 80°. Except where it is intended to also employ the helical seam for increasing the boom diameter, only several degrees of seam angle is required to give a sufficient number of turns of the seam to obtain the straightness influence of such turns on the boom in accord with the present invention. The straightness of a half-inch diameter boom of 150-foot length, for example, can be improved significantly by as few as 8 or 10 turns of the seam along its length; corresponding to a seam angle 35 of less than 1° and a longitudinal offset 30 between opposite mating portions of edges of strip 16, or of edges 23 of strip 22, of a small fraction of an inch. A hundred turns can be provided such a boom with a seam angle 35 of about 5° corresponding to an offset 30 of about one-eighth of an inch.

The extent of reduction in amount of longitudinal cumulative bending deflection of the boom as appears at its tip resultant from a uniform tendency along its length to curve in a particular direction relative to its seam can be expressed as the reciprocal of the product of $\pi$ and the number of seam turns along its length. For example, if the boom has a helical seam of 10 turns along its length, its longitudinal cumulative tip deflection will be reduced to about one-thirtieth that of a straight-seam boom with the same seam-oriented curvature tendency, and one with a hundred seam turns will reduce its tip deflection to about one three-hundreths of the straight-seam tip deflection.

The centerline of the helical seam boom, with the uniform tendency along its length to curve in a particular direction relative to its seam, will assume a helical path within a cylindrical envelope of a diameter which also represents domain comain of potential radial mislocation of the tip of the boom. Such helical-centerline-envelope diameter, for any given degree of curvature-tendency varies in inverse proportion to the square of the number of turns in the helical seam, so that such diameter for 10 turns will be one-hundredth that of one turn; with corresponding reduction in radial mislocation of the boom tip potential represented by such diameter. Similarly, 100 seam turns would give one ten-thousandth the potential radial tip mislocation as that of a single turn of the seam.

It is also feasible, in behalf of providing a helical-seam boom in accord with the present invention, to provide a notch-and-tab configuration for opposite edges of the strip, 15 or 22 of FIGS. I and II for example, in which the tabs 19 and 24 and/or notches 20 and 25 are not provided with an offset 31 as shown in these Figs., but are oppositely aligned as heretofore, FIG. III, and so proportional longitudinally of the strip edge as to afford the helical-seam-producing advancement of one strip edge relative to the other by causing the tab 19a or 24a on one strip edge to mate with an advanced tab 19b, 19c etc. or groove 25b, 25c etc. of the other strip edge during formation of the boom at the deployer means; it being understood that in this manner the helix angle 35, hence number of seam turns and boom diameter for a standard boom-forming strip will occur in steps according to the number of teeth 19 or grooves 25 which one strip edge is advanced during formation of the helical seam boom. Although such selective tooth or notch advancement leads to obtaining unrollable self-erecting and self-forming booms of selective numbers of seam turns or diameters from a standard strip width and edge configuration, it appears to be necessary that such strip requires creation of a self-bias which tends to curl itself into the desired helical-seam cylindrical boom configuration when unrestrained, and the guide means 34 of the deployer needs be compatible with the selected seam angle 35 and boom diameter which such strip tends to form. In the usual case of beryllium-copper strips 16, 22, the obtaining of such required self-bias of the strip will be obtained by a heat treating process to impart a springlike quality to such strip. Irrespective of the seam angle 35, the self bias of the strip, in addition to forming itself into a cylindrical configuration also biases the strip edges together when in their interlocking seam-forming state.

I claim as my invention

1. A thin-wall hollow tubular boom for use in space having a seperable seam with interlocked abutting edges biased together in extension helically around and along such boom, said boom being formed from an unrolled narrow elongated thin notched-edge springlike strip curled transversely into self-biased interlocked abutment at its edges as a seam in angulation relative to the longitudinal axis of the boom so formed.

2. The boom of claim 1, wherein the angulation of the interlocked seam is accommodated by longitudinal offset of complementary interfit configurations defined by notches on opposite edges of the strip relative to a flattened-out state of such strip.

3. The boom of claim 1, wherein the angulation of the interlocked seam is accommodated by suitable longitudinal proportioning of complementary notch-defined interfit configurations on opposite strip edges which are oppositvely-aligned relative to a flattened-out state of such strip.

4. In a method of erecting a space boom formed from a rolled-up elongated thin strip which curls itself transversely to form a continuous hollow cylinder when unrolled and has complementary interfitting configurations on its edges to form an interlocked abutting seam for such cylinder, the step of directing such edges together during unrolling of the strip along a seam line which is angulated relative to the longitudinal centerline of the strip when in a flattened-out state.